(12) United States Patent
Mutsuda et al.

(10) Patent No.: US 9,458,747 B2
(45) Date of Patent: Oct. 4, 2016

(54) ELECTRICALLY HEATED CATALYTIC CONVERTER

(71) Applicants: IBIDEN CO., LTD., Ogaki-shi (JP); TOYOTA JIDOSHA KABUSHIKI KAISHA, Toyota-shi (JP)

(72) Inventors: Fumiyuki Mutsuda, Ibi-gun (JP); Hideyuki Komitsu, Toyota (JP); Shoji Ogimura, Toyota (JP)

(73) Assignees: IBIDEN CO., LTD., Ogaki-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/922,198

(22) Filed: Oct. 26, 2015

(65) Prior Publication Data

US 2016/0115842 A1 Apr. 28, 2016

(30) Foreign Application Priority Data

Oct. 28, 2014 (JP) ................................. 2014-219390

(51) Int. Cl.
*F01N 3/10* (2006.01)
*F01N 3/20* (2006.01)
*F01N 3/28* (2006.01)
*F01N 13/18* (2010.01)

(52) U.S. Cl.
CPC ........... *F01N 3/2013* (2013.01); *F01N 3/2026* (2013.01); *F01N 3/2066* (2013.01); *F01N 3/2853* (2013.01); *F01N 13/18* (2013.01); *F01N 2510/00* (2013.01)

(58) Field of Classification Search
USPC ................. 60/272, 282, 299, 300, 303, 324; 422/168, 174, 175, 177
See application file for complete search history.

(56) References Cited

U.S. PATENT DOCUMENTS 5,839,276 A * 11/1998 Nishizawa ............ F01N 3/2026
422/171
6,128,821 A * 10/2000 Grescher ............... B01D 53/945
29/446

(Continued)

FOREIGN PATENT DOCUMENTS

EP 2685061 1/2014
JP 2013-185573 9/2013

*Primary Examiner* — Binh Q Tran
(74) *Attorney, Agent, or Firm* — Mori & Ward, LLP (57) ABSTRACT

The present invention provides a highly durable, electrically heated catalytic converter having a relatively simple structure while its inner tube is curved toward the central axis, wherein an insulation layer formed on the inner tube is less susceptible to cracking and peeling even when the inner tube is subjected to temperature changes or temperature gradients. An electrically heated catalytic converter for purifying exhaust gas includes a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube includes a first curved portion and a second curved portion formed in this order from the side closer to the catalyst carrier, the first curved portion is curved so as to outwardly project and the second curved portion is curved in the direction opposite to the curvature of the first curved portion so as to project toward the central axis, the second curved portion has a curvature radius larger than that of the first curved portion, and an insulation layer is formed on at least one portion of the inner tube.

8 Claims, 2 Drawing Sheets

(56) References Cited

U.S. PATENT DOCUMENTS 6,555,070 B1 * 4/2003 Kruger .................. F01N 3/2853
422/177
7,462,332 B2 * 12/2008 Hardesty ............... F01N 3/2853
422/177
8,741,224 B2 * 6/2014 Yoshioka .............. F01N 3/2026
422/174
2013/0183205 A1 7/2013 Yoshioka et al.

* cited by examiner

ELECTRICALLY HEATED CATALYTIC CONVERTER

TECHNICAL FIELD

The present invention relates to an electrically heated catalytic converter.

BACKGROUND ART

A catalytic converter supporting a catalyst capable of purifying exhaust gas is disposed in the route of an exhaust pipe in order to purify harmful substances contained in exhaust gas discharged from an engine.

To enhance the efficiency of the catalytic converter to purify harmful substances, the temperate inside the catalytic converter must be maintained at a temperature suitable for catalyst activation (hereinafter also referred to as catalyst activation temperature).

In the case of a vehicle not provided with a means that directly heats a catalyst carrier constituting the catalytic converter, the temperature of exhaust gas is low immediately after the vehicle starts running, so that the temperature inside the catalytic converter does not reach the catalyst activation temperature, making it difficult to effectively prevent discharge of harmful substances.

In addition, in the case of a hybrid vehicle not provided with a means that directly heats the catalyst carrier, the temperature inside the catalytic converter decreases while the motor is driven and the engine is stopped, and in some cases, the temperature inside the catalytic converter is lower than the catalyst activation temperature. Also in this case, it is difficult to effectively prevent discharge of harmful substances.

In order to solve these problems, for example, Patent Literature 1 discloses an invention in which the catalyst carrier itself is used as a heating element that generates heat by energization, and the temperature inside the catalytic converter is increased, if necessary, to or above the temperature of the catalyst activation temperature.

CITATION LIST

Patent Literature

Patent Literature 1: JP-A 2013-185573

SUMMARY OF INVENTION

Technical Problem

Figure 2:
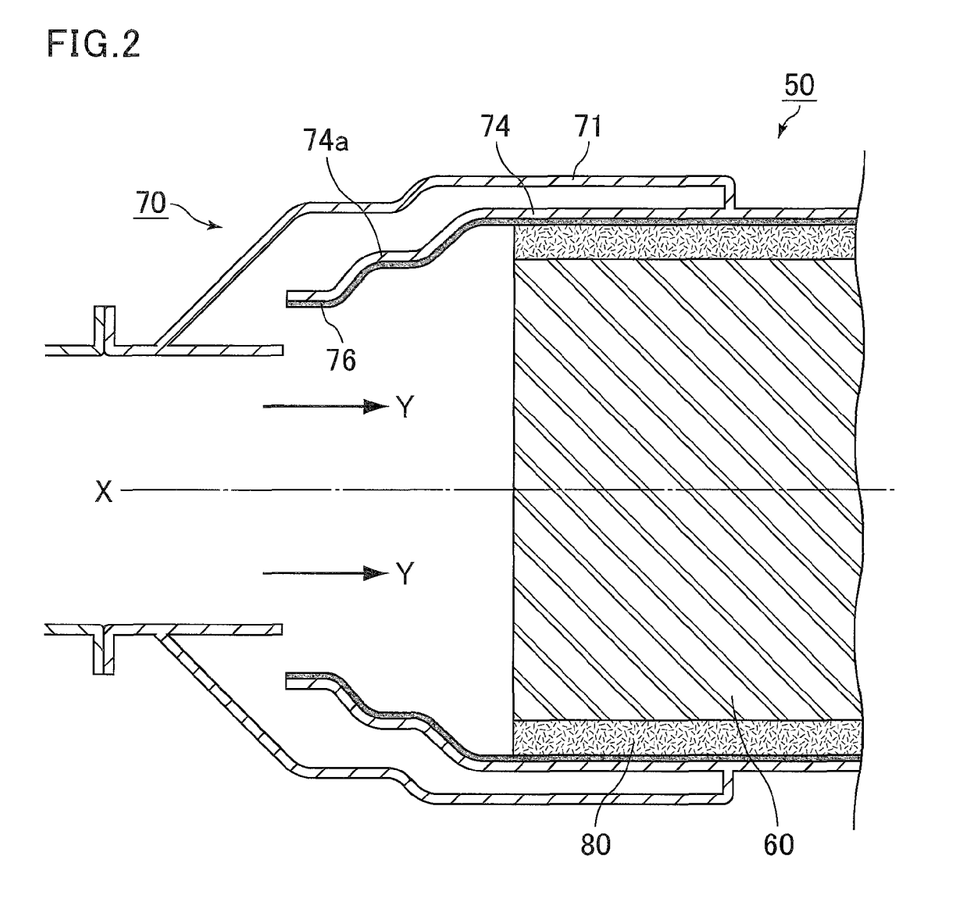
FIG. 2 is a cross-sectional view schematically showing a catalytic converter disclosed in Patent Literature 1.

FIG. 2 is a cross-sectional view schematically showing a catalytic converter disclosed in Patent Literature 1.

As shown in FIG. 2, an electrically heated catalytic converter 50 includes a catalyst carrier 60 as a heating element, a case 70 for accommodating the catalyst carrier 60, and an insulation mat 80 disposed between the case 70 and the catalyst carrier 60. The case 70 includes an outer tube 71 serving as an external partition wall, and an inner tube 74 disposed inside the outer tube 71. The inner tube 74 includes an insulation layer 76 to prevent a short circuit between the inner tube 74 and the catalyst carrier 60.

In addition, the inner tube 74 protrudes toward the central axis of the case 70, and such a protruding portion 74a is exposed to high-temperature heat of exhaust gas. Thus, even when particulate matter (hereinafter referred to as PM) such as soot is attached to the protruding portion 74a, oxidation of PM is accelerated by heat, and PM is removed by combustion. As a result, a short circuit is less likely to occur.

However, in the catalytic converter 50 disclosed in Patent Literature 1, the protruding portion 74a is bent twice or more in a complicated manner. Thus, the insulation layer 76 having a uniform thickness cannot be easily formed on the protruding portion 74a, and the insulation layer 76 thus has a non-uniform thickness. Unfortunately, the insulation layer 76 is susceptible to cracking and peeling due to the non-uniform thickness.

The present invention is made to solve the above problems. The present invention aims to provide a highly durable, electrically heated catalytic converter including an inner tube that is curved toward the central axis yet still having a relatively simple structure, wherein an insulation layer formed on the inner tube is less susceptible to cracking and peeling even when the inner tube is subjected to temperature changes or temperature gradients.

Solution to Problem

In order to achieve the above object, the present invention provides an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case, wherein the case includes an outer tube disposed at the outermost side and an inner tube disposed inside the outer tube; in a cross section upstream of the catalyst carrier taken along a plane including the central axis of the case, the inner tube includes a first curved portion and a second curved portion formed in this order from the side closer to the catalyst carrier, the first curved portion is curved so as to outwardly project and the second curved portion is curved in the direction opposite to the curvature of the first curved portion so as to project toward the central axis, the second curved portion has a curvature radius larger than that of the first curved portion, and an insulation layer is formed on at least one portion of the inner tube.

In the electrically heated catalytic converter, in a cross section upstream of the catalyst carrier taken along a plane including the central axis of the case, the inner tube includes a first curved portion and a second curved portion formed in this order from the side closer to the catalyst carrier, wherein the second curved portion has a curvature radius larger than that of the first curved portion. Since the inner tube has a relatively simple structure, an insulation layer can be relatively easily formed on the inner tube by a method such as application, and the thickness of the insulation layer can be relatively easily made uniform. Thus, the electrically heated catalytic converter is a highly durable, electrically heated catalytic converter, wherein the insulation layer is less susceptible to cracking and peeling even when the inner tube is subjected to temperature changes or temperature gradients.

In the electrically heated catalytic converter of the present invention, preferably, the insulation layer is formed from an amorphous inorganic material.

In the electrically heated catalytic converter, if an amorphous inorganic material is used to form the insulation layer, it is possible to relatively easily form an insulation layer having a uniform thickness by applying a raw material composition containing a powder of the amorphous inorganic material and the like as raw materials and then melting the raw material composition by heat.

In the electrically heated catalytic converter of the present invention, preferably, the insulation layer further contains a crystalline inorganic material.

In the electrically heated catalytic converter, if the insulation layer contains a crystalline inorganic material having heat resistance, it is possible to improve the heat resistance of the insulation layer and to mechanically reinforce the insulation layer.

In the electrically heated catalytic converter of the present invention, the thickness of the insulation layer is preferably 100 to 400 μm.

In the electrically heated catalytic converter, the insulation layer having a thickness of 100 to 400 μm can provide sufficient insulation and prevent a short circuit between the inner tube and the catalyst carrier.

An insulation layer having a thickness of less than 100 μm is too thin to provide sufficient insulation. In contrast, an insulation layer having a thickness of more than 400 μm is so thick that a temperature difference easily occurs inside the insulation layer, making the insulation layer susceptible to cracking and the like.

In the electrically heated catalytic converter of the present invention, preferably, the amorphous inorganic material is formed of low softening point glass having a softening point of 300° C. to 1000° C.

In the electrically heated catalytic converter, if the amorphous inorganic material is formed of low softening point glass having a softening point of 300° C. to 1000° C., it is possible to relatively easily form the insulation layer by applying the raw material composition containing the low softening point glass to the inner tube and then melting the raw material composition by heat.

If the softening point of the low softening point glass is below 300° C., a layer to be turned into the insulation layer will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube may be degraded by heat.

In the electrically heated catalytic converter of the present invention, preferably, the low softening point glass includes at least one of barium glass, boron glass, strontium glass, alumina silicate glass, soda-zinc glass, and soda-barium glass.

In the electrically heated catalytic converter of the present invention, preferably, the crystalline inorganic material includes at least one of calcia, magnesia, ceria, alumina, and an oxide of a transition metal.

In the electrically heated catalytic converter, if the insulation layer contains at least one of calcia, magnesia, ceria, alumina, and an oxide of a transition metal which are heat resistant, it is possible to improve the heat resistance and the mechanical characteristics of the insulation layer.

In the electrically heated catalytic converter of the present invention, preferably, a portion of the surface of the inner tube where the insulation layer is to be formed is roughened.

In the electrically heated catalytic converter, roughening the portion of the surface of the inner tube can increase the surface area of the inner tube and improve adhesion between the insulation layer and the inner tube, thus making it possible to form an insulation layer that is less susceptible to peeling even when exposed to temperature changes or the like.

DESCRIPTION OF EMBODIMENTS

The present invention is described in detail below. The present invention is not limited to the following description, and may be appropriately modified without departing from the gist of the present invention.

The electrically heated catalytic converter of the present invention is described below.

The electrically heated catalytic converter of the present invention is an electrically heated catalytic converter for purifying exhaust gas, the electrically heated catalytic converter including a catalyst carrier supporting a catalyst and configured to generate heat by energization; a case for accommodating the catalyst carrier; and an electrical insulation mat interposed between the catalyst carrier and the case;

wherein the case includes an outer tube disposed at the outermost side and an inner tube disposed inside the outer tube; in across section upstream of the catalyst carrier taken along a plane including the central axis of the case, the inner tube includes a first curved portion and a second curved portion formed in this order from the side closer to the catalyst carrier, the first curved portion is curved so as to outwardly project and the second curved portion is curved in the direction opposite to the curvature of the first curved portion so as to project toward the central axis, the second curved portion has a curvature radius larger than that of the first curved portion, and an insulation layer is formed on at least one portion of the inner tube.

Figure 1:
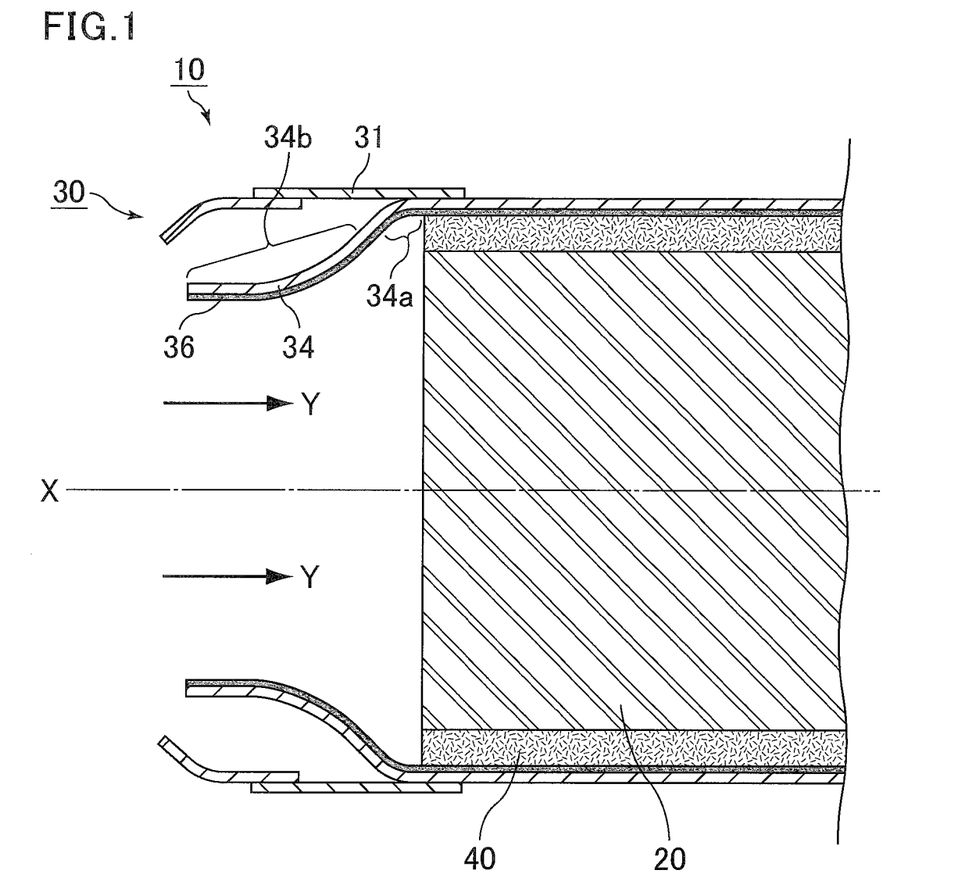
FIG. 1 is a cross-sectional view schematically showing an example of the electrically heated catalytic converter according to the present invention.

FIG. 1 is a cross-sectional view schematically showing an example of the electrically heated catalytic converter according to the present invention.

An electrically heated catalytic converter 10 shown in FIG. 1 is provided to an exhaust pipe of an internal combustion engine mounted in a vehicle. The internal combustion engine may be a diesel engine or a gasoline engine. The electrically heated catalytic converter may also be used in a vehicle that employs a hybrid system equipped with an electric motor.

FIG. 1 shows a vertical cross-sectional view of the electrically heated catalytic converter 10 taken along an central axis X thereof. FIG. 1($a$) shows a catalyst carrier 20 only in the upstream side of the flow of exhaust gas closer to the engine.

As shown in FIG. 1, the electrically heated catalytic converter 10 according to the present invention includes a catalyst carrier 20 supporting a catalyst and configured to generate heat by energization, a case 30 for accommodating the catalyst carrier 20, and an electrical insulation mat 40 interposed between the catalyst carrier 20 and the case 30.

The case 30 has a cylindrical shape having a central axis X as the center, and includes an outer tube 31 disposed at the outermost side and an inner tube 34 disposed inside the outer tube 31.

In the cross-sectional view of FIG. 1, the inner tube 34 includes a first curved portion 34$a$ and a second curved portion 34$b$, which are sequentially formed starting from the side close to the catalyst carrier 20. The first curved portion 34$a$ is curved so as to outwardly project, and the second curved portion 34b is curved in the direction opposite to the curvature of the first curved portion 34a so as to project toward the central axis. The curvature radius of the second curved portion 34b is greater than the curvature radius of the first curved portion 34a, and an insulation layer 36 is formed inside the inner tube 34.

As described above, the inner tube 34 is disposed inside the outer tube 31, thus forming a double pipe. The radius of the inner tube 34 decreases toward the upstream side closer to the engine, so that gas that does not flow much will be present between the outer tube 31 and the inner tube 34. As a result, heat transfer from the inner tube 34 to the outer tube 31 can be suppressed, increasing the temperature of the inner tube 34. Thus, even when PM is attached to the inner tube 34, oxidation of PM is accelerated, allowing PM to be easily removed. In order to provide insulation, the insulation layer 36 is formed at least inside the inner tube 34. In order to more reliably provide insulation, preferably, the insulation layer 36 is formed both inside and outside the inner tube 34. It is more preferred that the insulation layer 36 is further provided inside the outer tube 31.

Examples of materials of the case 30 (the outer tube 31 and the inner tube 34) constituting the electrically heated catalytic converter 10 include metals such as stainless steel, steel, iron, and copper, and nickel alloys such as Inconel, Hastelloy, and Invar. In order to improve adhesion between the insulation layer 36 and the inner tube 34 constituting the case 30, a portion of the inner tube 34 where the insulation layer 36 is to be formed may be roughened by sandblasting treatment or with a chemical agent.

The surface roughness $Rz_{JIS}$ of the surface of the inner tube 34, which is obtained by the roughening treatment, is preferably 1.5 to 20 µm. The surface roughness $Rz_{JIS}$ of the roughened surface is a 10-spot average of roughness as defined in JIS B 0601 (2001). The measurement distance is 10 mm.

If the surface roughness $Rz_{JIS}$ of the roughened surface of the inner tube 34 is less than 1.5 µm, it will be difficult to provide sufficient adhesion between the inner tube 34 and the insulation layer 36 due to the small surface area of the inner tube 34. In contrast, if the surface roughness $Rz_{JIS}$ of the roughened surface of the inner tube 34 is more than 20 µm, it will be difficult to form the insulation layer 36 on the surface of the inner tube 34. Presumably, this is because if the surface roughness $Rz_{JIS}$ of the roughened surface of the inner tube 34 is too large, slurry (a raw material composition for the insulation layer) will not flow into depressions of the irregularities formed on the surface of the inner tube 34, thus forming voids in these depressions.

The surface roughness $Rz_{JIS}$ of the roughened surface of the inner tube can be measured using Handy Surf E-35B (Tokyo Seimitsu Co., Ltd.) in accordance with JIS B 0601 (2001), with a measurement distance of 10 mm.

In the electrically heated catalytic converter 10 shown in FIG. 1, the insulation layer 36 is formed inside the inner tube 34. Yet, as described above, the insulation layer 36 may be formed entirely both inside and outside the inner tube 34.

In the electrically heated catalytic converter 10 shown in FIG. 1, the insulation layer 36 formed inside the inner tube 34 is formed from an amorphous inorganic material, or is formed from an amorphous inorganic material and particles of a crystalline inorganic material dispersed inside a layer formed from the amorphous inorganic material.

Preferably, the amorphous inorganic material constituting the insulation layer 36 is formed of low softening point glass having a softening point of 300° C. to 1000° C.

In the electrically heated catalytic converter 10 of the present invention, in the case where the amorphous inorganic material is formed of low softening point glass having a softening point of 300° C. to 1000° C., the insulation layer 36 can be relatively easily formed by applying a raw material composition containing the low softening point glass to the inner tube 34 and then melting the raw material composition by heat.

If the softening point of the low softening point glass is below 300° C., a layer to be turned into the insulation layer 36 will easily flow due to melting or the like during heat treatment because the softening point is too low, making it difficult to form a layer having a uniform thickness. In contrast, if the softening point of the low softening point glass is above 1000° C., the temperature setting for heat treatment must be very high. Thus, the mechanical characteristics of the inner tube 34 may be degraded by heat.

Preferably, the low softening point glass includes at least one of barium glass, boron glass, strontium glass, alumina silicate glass, soda-zinc glass, and soda-barium glass. These kinds of glass may be used alone or in mixture of two or more thereof.

The crystalline inorganic material that may be contained in the insulation layer 36 includes at least one of calcia, magnesia, ceria, alumina, and an oxide of a transition metal. Examples of the oxide of a transition metal include zirconia, yttria, niobium oxide, titania, chromium oxide, manganese oxide, iron oxide, copper oxide, cobalt oxide, and chromium oxide.

The crystalline inorganic material may also include oxides such as zirconia, for example, yttria-stabilized zirconia, CaO-stabilized zirconia, MgO-stabilized zirconia, zircon, CeO-stabilized zirconia, etc.

The crystalline inorganic materials in the insulation layer 36 can improve heat resistance and mechanical characteristics of the insulation layer 36.

In the case where the insulation layer 36 contains particles of the crystalline inorganic material, the average particle size of the particles of the crystalline inorganic material is preferably 0.1 to 50 µm, more preferably 0.1 µm or more and less than 10 µm.

If the average particle size of the particles of the crystalline inorganic material is in the range of 0.1 to 50 µm, the surface area of the crystalline inorganic material in a melting layer will be in an adequate range when the melting layer is formed by applying a raw material to the surface of the inner tube 34 and then heating. Thus, the viscosity of a coating layer in a molten state will be maintained in an appropriate range without becoming too low, and the insulation layer 36 having a uniform thickness can be formed.

If the average particle size of the particles of the crystalline inorganic material in the insulation layer 36 is less than 0.1 µm, the surface area of the particles of the crystalline inorganic material in the melting layer will be too large because the particle size of the crystalline inorganic material particles is too small, excessively increasing the viscosity of the melting layer containing the particles of the crystalline inorganic material. Thus, the insulation layer 36 having a uniform thickness cannot be formed.

In contrast, if the average particle size of the particles of the crystalline inorganic material is more than 50 µm, the surface area of the particles of the crystalline inorganic material in the melting layer will be too small because the particle size of the crystalline inorganic material particles is too large, reducing the viscosity of the melting layer containing the particles of the crystalline inorganic material.

Thus, the resulting melting layer will easily flow, and the insulation layer 36 to be formed will be thin.

In the case where the insulation layer 36 contains the crystalline inorganic material, the proportion of the crystalline inorganic material is preferably 5 to 70% by weight, more preferably 20 to 70% by weight, relative to the entire insulation layer 36.

If the proportion of particles of the crystalline inorganic material is in the range of 5 to 70% by weight relative to the entire insulation layer 36, the weight proportion of the crystalline inorganic material in the melting layer will be in an adequate range when the melting layer is formed by applying a raw material to the surface of the inner tube 34 and then heating. Thus, the viscosity of a coating layer in a molten state will be maintained in an appropriate range without becoming too low, and the insulation layer 36 having a uniform thickness can be formed.

In the electrically heated catalytic converter 10 of the present invention, a preferred lower limit of the thickness of the inner tube 34 is 0.8 mm, and a more preferred lower limit thereof is 1.2 mm. A preferred upper limit thereof is 3 mm, and a more preferred upper limit thereof is 2 mm.

The inner tube 34 having a thickness of less than 0.8 mm does not have sufficient strength. The inner tube 34 having a thickness of more than 3 mm cannot be easily formed into a specific shape.

The thickness of the insulation layer 36 formed on the inner tube 34 is preferably 100 to 400 μm.

The insulation layer 36 having a thickness of 100 to 400 μm can provide sufficient insulation and can prevent a short circuit between the inner tube 34 and the catalyst carrier 20.

The insulation layer 36 having a thickness of less than 100 μm is too thin to provide sufficient insulation. In contrast, the insulation layer 36 having a thickness of more than 400 μm is so thick that a temperature difference easily occurs inside the insulation layer 36, making the insulation layer 36 susceptible to cracking and the like. The thickness of the insulation layer 36 is preferably 100 to 200 μm, more preferably 110 to 140 μm.

In the electrically heated catalytic converter 10 shown in FIG. 1, the first curved portion 34a of the inner tube 34 is curved so as to outwardly project, and the curvature radius of the first curved portion 34a is preferably 5 to 15 mm.

In the electrically heated catalytic converter, the thickness of the insulation layer 36 in the first curved portion 34a is preferably equal to or greater than one time to less than 1.4 times the thickness of the insulation layer 36 in other portions.

If the thickness of the insulation layer 36 in the first curved portion 34a is less than one time the thickness of the insulation layer 36 in other portions, insulation will be insufficient because the insulation layer is thin, and a short circuit may occur between the inner tube 34 and the catalyst carrier 20. In addition, the strength of the insulation layer is likely to be insufficient, making the insulation layer susceptible to damage by external shock.

If the thickness of the insulation layer 36 in the first curved portion 34a is equal to or greater than 1.4 times the thickness of the insulation layer 36 in other portions, thermal stress will not be easily alleviated, and the insulation layer will be susceptible to cracking and peeling due to internal thermal stress.

In the electrically heated catalytic converter 10 shown in FIG. 1, the second curved portion 34b is curved in the direction opposite to the curvature of the first curved portion 34a so as to project toward the central axis, and the curvature radius of the second curved portion 34b is larger than the curvature radius of the first curved portion 34a. The curvature radius of the second curved portion 34b is preferably 40 to 50 mm.

The second curved portion 34b has a curvature radius larger than that of first curved portion 34a. Thus, no big problems will occur as long as the insulation layer 36 has a thickness of 100 to 400 μm. The thickness of the insulation layer 36 in the second curved portion 34b is preferably 100 to 200 μm, more preferably 110 to 140 μm.

The electrically heated catalytic converter 10 of the present invention includes the catalyst carrier 20. The catalyst carrier 20 includes a ceramic honeycomb structured body formed from porous ceramic or the like. Exhaust gas flows into through holes, each of which is opened at both end faces on the exhaust gas inlet side and the exhaust gas outlet side, and the exhaust gas is purified by the action of the catalyst carried on a partition wall separating the through holes from each other.

The catalyst carrier 20 constituting the electrically heated catalytic converter 10 of the present invention is configured to generate heat by energization, and is formed using a ceramic material having a specific resistance, such as silicon carbide.

Fired bodies of such porous materials are brittle and thus easily broken by mechanical shock or the like. However, in the electrically heated catalytic converter 10 of the present invention, the electrical insulation mat 40 is disposed around the lateral side of the catalyst carrier 20 to absorb shock, making it possible to prevent cracking and the like in the catalyst carrier 20 resulting from mechanical shock and thermal shock.

Preferably, the electrical insulation mat 40 constituting the electrically heated catalytic converter 10 of the present invention is a mat containing inorganic fibers. The inorganic fibers constituting the mat are not particularly limited, and may be alumina-silica fibers, alumina fibers, silica fibers, or the like. Alternatively, glass fibers or biosoluble fibers may be used. The kind of inorganic fibers may be changed, for example, in accordance with characteristics (such as heat resistance and resistance to wind-induced erosion) required of the mat. It is preferred to use fibers having a diameter and a length conformable to environmental regulations of individual countries.

The following description is given of a method for forming the insulation layer in the inner tube constituting the electrically heated catalytic converter of the present invention.

A raw material composition for forming the insulation layer contains particles of only amorphous inorganic material or contains particles of both amorphous inorganic material and crystalline inorganic material. The raw material composition may also contain a dispersion medium, an organic binder, and the like.

In the case where the raw material composition for forming the insulation layer contains a crystalline inorganic material, as described above, the weight proportion of the crystalline inorganic material is preferably 5 to 70% by weight, more preferably 20 to 70% by weight, relative to the total amount of the amorphous inorganic material and the crystalline inorganic material. In this case, the average particle size of the particles of the crystalline inorganic material is preferably 0.1 to 50 μm.

When the amorphous inorganic material in the raw material composition is applied to the surface of the inner tube and heated, the amorphous inorganic material is melted and a layer of the amorphous inorganic material is formed. Thus, there is no need to strictly control the particle size of the amorphous inorganic material; however, in the case where the raw material composition contains the crystalline inorganic material, the particles of the amorphous inorganic material must be uniformly dispersed in the raw material composition for forming the insulation layer.

In this aspect, the average particle size of the particles of the amorphous inorganic material in the raw material composition is preferably 0.1 to 100 μm, more preferably 1 to 20 μm. The particles having an average particle size in the range of 1 to 20 μm, which are presumably less affected by electrostatic charge on the particle surface, can be easily uniformly dispersed.

Examples of the dispersion medium include water and organic solvents such as methanol, ethanol, and acetone. The ratio of a powder of the amorphous inorganic material to the dispersion medium to be contained in the raw material composition is not particularly limited. For example, the amount of the dispersion medium is preferably 50 to 150 parts by weight relative to 100 parts by weight of the powder of the amorphous inorganic material, so that the raw material composition will have a viscosity suitable for application to the inner tube.

Examples of organic binders that can be added to the raw material composition for forming the insulation layer include polyvinyl alcohol, methyl cellulose, ethyl cellulose, and carboxymethyl cellulose. These may be used alone or in combination of two or more thereof. The dispersion medium and the organic binder can be used together.

The following description is given on specific steps for forming the insulation layer in the inner tube.

(1) Inner Tube Pretreatment Step

First, it is preferred to perform washing treatment to remove impurities from the surface of the inner tube.

The washing treatment is not particularly limited, and any conventionally known washing treatment can be used. Specific examples include methods such as ultrasonic cleaning in an alcohol solvent.

In addition, after the washing treatment, roughening treatment may be performed on the surface of the inner tube, if necessary, in order to increase the specific surface area of the inner tube or to adjust the roughness of the surface of the inner tube. Specific examples of roughening treatment include sandblasting treatment, etching treatment, and high temperature oxidation treatment. These treatments may be used alone or in combination of two or more thereof. Additional washing treatment may be performed after the roughening treatment.

(2) Step of Forming the Insulation Layer in the Inner Tube

First, an amorphous inorganic material, an organic binder, a dispersion medium, and the like are mixed to prepare a raw material composition for forming the insulation layer. Particles of a crystalline inorganic material may be added, if necessary.

Specifically, for example, a powder of an amorphous inorganic material and a powder of a crystalline inorganic material that is added if necessary are prepared to have a specific particle size, a specific shape, and the like. Then, these powders are dry-mixed at a specific ratio to prepare a powder mixture. Further, water, an organic binder, and the like are added to and wet-mixed with the powder mixture in a ball mill. Thus, a raw material composition for forming the insulation layer is prepared.

The ratio of water to a powder of an amorphous inorganic material and the like is not particularly limited. Yet, the amount of water is preferably about 100 parts by weight relative to 100 parts by weight of a powder of an amorphous inorganic material and the like, so that the raw material composition will have a viscosity suitable for application to the inner tube. As described above, a dispersion medium and the like (for example, an organic solvent) may also be added to the raw material composition for forming the insulation layer, if necessary.

(3) Next, the raw material composition for forming the insulation layer is applied to the surface of the inner tube.

The raw material composition can be applied by a method such as spray coating, electrostatic coating, ink-jet printing, transfer (transfer using a stamp, a roller, or the like), brushing, or electrodeposition coating.

(4) Subsequently, heat treatment is performed on the inner tube in which a coating film for the insulation layer is formed.

Specifically, the insulation layer is formed by first drying the metal inner tube to which the raw material composition has been applied and then heating.

The heating temperature is preferably equal to or higher than the softening point of the amorphous inorganic material. The heating temperature is preferably 700° C. to 1100° C., although it depends on the kind of amorphous inorganic material. The heating temperature is preferably equal to or higher than the softening point of the amorphous inorganic material because it makes it possible to achieve strong adhesion between the inner tube and the amorphous inorganic material and to form an insulation layer that is strongly adhered to the inner tube.

The effects of the electrically heated catalytic converter of the present invention are listed below.

(1) In the electrically heated catalytic converter of the present invention, the case for accommodating the catalyst carrier includes an outer tube disposed at the outermost side and an inner tube disposed inside the outer tube. In a cross section upstream of the catalyst carrier taken along a plane including the central axis of the case, the inner tube includes a first curved portion and a second curved portion formed in this order from the side closer to the catalyst carrier, the first curved portion is curved so as to outwardly project and the second curved portion is curved in the direction opposite to the curvature of the first curved portion so as to project toward the central axis, the second curved portion has a curvature radius larger than that of the first curved portion, and an insulation layer is formed on at least one portion of the inner tube. As described above, since the case itself has a relatively simple structure, an insulation layer can be relatively easily formed on the inner tube by a method such as application, and the thickness of the insulation layer can be relatively easily made uniform. Thus, the electrically heated catalytic converter is a highly durable, electrically heated catalytic converter, wherein the insulation layer is less susceptible to cracking and peeling even when the inner tube is subjected to temperature changes or temperature gradients, and a short circuit between the inner tube and the catalyst carrier can be prevented.

(2) In the electrically heated catalytic converter of the present invention, the insulation layer having a thickness of 100 to 400 μm is formed on the inner tube. Thus, it is possible to provide sufficient insulation and prevent a short circuit between the inner tube and the catalyst carrier.

(3) In the electrically heated catalytic converter of the present invention, in the case where the amorphous inorganic material is formed of low softening point glass having a softening point of 300° C. to 1000° C., it is possible to relatively easily form the insulation layer by forming a coating layer of the raw material composition on the surface of the inner tube by means of application or the like and then heating.

(4) In the electrically heated catalytic converter, in the case where the insulation layer contains a crystalline inorganic material in the layer of the amorphous inorganic material, it is possible to improve the heat resistance of the insulation layer and to mechanically reinforce the insulation layer.

EXAMPLES

Examples that more specifically disclose the electrically heated catalytic converter of the present invention are described below. The present invention is not limited to these examples.

Example 1

(1) Provision of a Cylindrical Body

A stainless-steel (SUS 430) cylindrical body was provided. The shape of the cylindrical body was substantially the same as that of the inner tube 34 shown in FIG. 1; and in a cross section taken along a plane including the central axis, the cylindrical body included a first curved portion and a second curved portion. The first curved portion was curved so as to outwardly project, and the second curved portion was curved in the direction opposite to the curvature of the first curved portion so as to project toward the central axis. In the cylindrical body, the diameter of a portion having a largest diameter was 105 mm, the diameter of a portion having a smallest diameter was 60 mm, the thickness was 1.5 mm, and the curvature radii of the first curved portion and the second curved portion were as shown in Table 1. This cylindrical body was washed by ultrasonic cleaning in an alcohol solvent.

Next, sandblasting treatment was performed to roughen the inner side of the cylindrical body. The sandblasting treatment was performed using #100 $Al_2O_3$ abrasive grains for 10 minutes.

The surface roughness on the inner side of the cylindrical body was measured using a surface roughness meter (Handy Surf E-35B, Tokyo Seimitsu Co., Ltd.), with a measurement distance of 10 mm. As a result, the surface roughness on the inner side of the cylindrical body had $Rz_{JIS}$ of 5 μm.

(2) Preparation of the Raw Material Composition for Forming the Insulation Layer Barium silicate glass (softening point of 770° C.) was provided as a powder of the amorphous inorganic material. The concentration of the amorphous inorganic material was 51% by weight relative to the entire raw material composition. The term "concentration" refers to the proportion in percentage of the amorphous inorganic material relative to the total amount of the raw material composition for forming the insulation layer including water and the like.

In addition, methyl cellulose was provided as an organic binder, and added in such a manner that its concentration would be 5% by weight relative to the entire raw material composition for forming the insulation layer.

For preparation of the raw material composition for forming the insulation layer, water was also added in such a manner that the proportion of water would be 100 parts by weight relative to 100 parts by weight of the powder of the amorphous inorganic material, and particles of α-alumina (average particle size: 10 μm) were also added in an amount of 15 parts by weight. These components were wet-mixed in a ball mill. Thus, a raw material composition was obtained.

The average particle size of the α-alumina particles was determined using a laser diffraction particle size analyzer (SALD-300V, Shimadzu Corporation).

(3) Formation of the Insulation Layer

The prepared raw material composition was applied to the inner side of the cylindrical body by a spray coating method, and dried in a drying apparatus at 100° C. for 60 minutes. Subsequently, heat treatment was performed at 820° C. for 180 minutes to form an insulation layer on the inner side of the cylindrical body. Evaluation was performed as described below.

Example 2

An insulation layer was formed on the inner side of a cylindrical body in the same manner as in Example 1 except for using a cylindrical body whose shape was changed in such a manner that the curvature radius of the first curved portion and the second curved portion was changed as shown in Table 1. Evaluation was performed as described below.

Evaluation of the cylindrical body in which the insulation layer was formed (Measurement of the Layer Thickness)

The thickness of each insulation layer formed on the inner side of the cylindrical bodies obtained in Examples 1 and 2 was measured with Dual Scope MP40 (Fischer Instruments K.K.).

Table 1 shows the thickness of the insulation layer in the first curved portion and the thickness of the insulation layer in the second curved portion, as measured in the manner described above.

(Evaluation of Initial Insulation of the Insulation Layer)

In each of the cylindrical bodies obtained in Examples 1 and 2, Cu particles were applied to the surface of the insulation layer 36 by sputtering, and a pair of electrodes was placed on the surface of the insulation layer 36 and the outer surface of each cylindrical body. Next, a voltage of 500 V was applied across the pair of electrodes, and the resistance between the surface of the insulation layer 36 and the outer surface of the cylindrical body was measured using a resistance meter. The resistance meter was Digital Ultra-High Resistance/Micro Current Meter (R8340, Advantest Corporation). With respect to the insulation layer 36 having a thickness of 100 μm or more, if the resistance between the surface of the insulation layer 36 and the outer surface of the cylindrical body was $4.0 \times 10^4 \Omega$, or higher, the insulation layer 36 was evaluated as having insulation and indicated by A; and if the resistance was lower than $4.0 \times 10^4 \Omega$, the insulation layer 36 was evaluated as not having insulation and indicated by B.

(Evaluation of Durability by Thermal Test)

The cylindrical bodies obtained in Examples 1 and 2 were heated to 800° C. In this state, each cylindrical body was placed on a room-temperature, thick metal plate, and was naturally cooled to 150° C. in five minutes. Subsequently, the cylindrical bodies were collected, and the conditions of the insulation layers were visually observed to check for cracking and peeling. Table 1 shows the results. In Table 1, the cylindrical bodies without defects such as cracking and peeling were indicated by A; and the cylindrical bodies with defects such as cracking and peeling were indicated by B.

TABLE 1

|  | Curvature radius of the first curved portion (mm) | Curvature radius of the second curved portion (mm) | Thickness of the insulation layer on the first curved portion (μm) | Thickness of the insulation layer on the second curved portion (μm) | Initial insulation | Peeling and cracking after thermal test |
|---|---|---|---|---|---|---|
| Example 1 | 10 | 40 | 100 | 150 | A | A |
| Example 2 | 15 | 50 | 160 | 288 | A | A |

As shown in Table 1, in each of the cylindrical bodies according to Examples 1 and 2, the insulation layer formed exhibited good insulation, and defects such as peeling and cracking were not found after the thermal test. This clearly shows that an insulation layer excellent in insulation and durability without defects can be formed on the inner tube 34 having a shape shown in FIG. 1.

REFERENCE SIGNS LIST

10 electrically heated catalytic converter
20 catalyst carrier
30 case
31 outer tube
34 inner tube
34a first curved portion
34b second curved portion
36 insulation layer
40 mat

The invention claimed is:

1. An electrically heated catalytic converter for purifying exhaust gas, the electrically heated catalytic converter comprising:
    a catalyst carrier supporting a catalyst and configured to generate heat by energization;
    a case for accommodating the catalyst carrier; and
    an electrical insulation mat interposed between the catalyst carrier and the case,
    wherein the case comprises an outer tube disposed at the outermost side and an inner tube disposed inside the outer tube;
    in a cross section upstream of the catalyst carrier taken along a plane including the central axis of the case,
    the inner tube comprises a first curved portion and a second curved portion formed in this order from the side closer to the catalyst carrier,
    the first curved portion is curved so as to outwardly project and the second curved portion is curved in the direction opposite to the curvature of the first curved portion so as to project toward the central axis,
    the second curved portion has a curvature radius larger than that of the first curved portion, and
    an insulation layer is formed on at least one portion of the inner tube.

2. The electrically heated catalytic converter according to claim 1,
    wherein the insulation layer is formed from an amorphous inorganic material.

3. The electrically heated catalytic converter according to claim 2,
    wherein the insulation layer further contains a crystalline inorganic material.

4. The electrically heated catalytic converter according to claim 1,
    wherein the insulation layer has a thickness of 100 to 400 µm.

5. The electrically heated catalytic converter according to claim 2,
    wherein the amorphous inorganic material is formed of low softening point glass having a softening point of 300° C. to 1000° C.

6. The electrically heated catalytic converter according to claim 5,
    wherein the low softening point glass includes at least one of barium glass, boron glass, strontium glass, alumina silicate glass, soda-zinc glass, and soda-barium glass.

7. The electrically heated catalytic converter according to claim 3,
    wherein the crystalline inorganic material includes at least one of calcia, magnesia, ceria, alumina, and an oxide of a transition metal.

8. The electrically heated catalytic converter according to claim 1,
    wherein a portion of the surface of the inner tube where the insulation layer is to be formed is roughened.

* * * * *